United States Patent
Wang et al.

(10) Patent No.: US 12,277,549 B2
(45) Date of Patent: Apr. 15, 2025

(54) BLOCKCHAIN-BASED TRANSACTION SYSTEM FOR GREEN CERTIFICATE

(71) Applicants: STATE GRID BLOCKCHAIN TECHNOLOGY (BEIJING) CO., LTD., Beijing (CN); State Grid Digital Technology Holding CO., LTD., Beijing (CN); State Grid Corporation of China, Beijing (CN)

(72) Inventors: Dong Wang, Beijing (CN); Wei Jiang, Beijing (CN); Da Li, Beijing (CN); Jiaxing Xuan, Beijing (CN); Guomin Li, Beijing (CN); Hejian Wang, Beijing (CN); Xin Shi, Beijing (CN); Jiangtao Li, Beijing (CN); Zhan Su, Beijing (CN); Lei Zhou, Beijing (CN); Lihua Zhao, Beijing (CN); Fan Jia, Beijing (CN)

(73) Assignees: STATE GRID BLOCKCHAIN TECHNOLOGY (BEIJING) CO., LTD., Beijing (CN); State Grid Digital Technology Holding CO., LTD., Beijing (CN); State Grid Corporation of China, Beijing (CN)

(*) Notice: Subject to any disclaimer, the term of this patent is extended or adjusted under 35 U.S.C. 154(b) by 81 days.

(21) Appl. No.: 17/784,627

(22) PCT Filed: Jan. 21, 2022

(86) PCT No.: PCT/CN2022/073319
§ 371 (c)(1),
(2) Date: Jun. 10, 2022

(87) PCT Pub. No.: WO2022/206143
PCT Pub. Date: Oct. 6, 2022

(65) Prior Publication Data
US 2024/0185233 A1    Jun. 6, 2024

(30) Foreign Application Priority Data

Mar. 29, 2021   (CN) .......................... 202110331886.8

(51) Int. Cl.
*G06Q 20/38* (2012.01)
*G06F 16/23* (2019.01)
(Continued)

(52) U.S. Cl.
CPC .... *G06Q 20/38215* (2013.01); *G06F 16/2393* (2019.01); *G06F 21/602* (2013.01);
(Continued)

(58) Field of Classification Search
CPC .......... G06Q 20/38215; G06Q 20/389; G06Q 20/401; G06Q 30/0206; G06Q 30/08;
(Continued)

(56) References Cited

U.S. PATENT DOCUMENTS

2019/0379754 A1* 12/2019 Krishnaswamy ..... H04L 67/104
2021/0226774 A1*  7/2021 Padmanabhan ....... H04L 9/0643
(Continued)

FOREIGN PATENT DOCUMENTS

CN    107480987 A  * 12/2017
CN    112365330 A  *  2/2021
(Continued)

*Primary Examiner* — John W Hayes
*Assistant Examiner* — Edgar R. Martinez-Hernandez (57) ABSTRACT

A blockchain-based transaction system for a green certificate includes an audit node, a proxy node, and an off-chain node. The proxy node is used by a power producer and a purchaser; the audit node verifies qualification information of the power producer, and send a green certificate to the power producer; the off-chain node predicts a transaction price of a next transaction; when receiving sale information of the power producer and purchase information of the purchaser, the proxy node sends the sale information, a digital signature (Continued)

of the power producer, the purchase information, and a digital signature of the purchaser to the off-chain node; the off-chain node matches the sale information and the purchase information, and sends successfully matched transaction information to the proxy node; the proxy node sends the successfully matched transaction information to a transaction smart contract; and the transaction smart contract performs transaction processing.

9 Claims, 2 Drawing Sheets (51) Int. Cl.
| | |
|---|---|
| G06F 16/27 | (2019.01) |
| G06F 21/60 | (2013.01) |
| G06F 21/64 | (2013.01) |
| G06Q 20/40 | (2012.01) |
| G06Q 30/0201 | (2023.01) |
| G06Q 30/08 | (2012.01) |
| G06Q 40/04 | (2012.01) |
| G06Q 50/06 | (2024.01) |

(52) U.S. Cl.
CPC ........... *G06F 21/64* (2013.01); *G06Q 20/389* (2013.01); *G06Q 20/401* (2013.01); *G06Q 30/0206* (2013.01); *G06Q 30/08* (2013.01); *G06Q 50/06* (2013.01); *G06F 16/27* (2019.01); *G06Q 40/04* (2013.01)

(58) Field of Classification Search
CPC .... G06Q 50/06; G06Q 40/04; G06F 16/2393; G06F 21/602; G06F 21/64; G06F 16/27
See application file for complete search history.

(56) References Cited

U.S. PATENT DOCUMENTS

| | | | | |
|---|---|---|---|---|
| 2022/0138640 | A1* | 5/2022 | Augustine | ............. H04L 67/535 705/5 |
| 2024/0348592 | A1* | 10/2024 | Fraser Brown | ....... H04L 63/101 |

FOREIGN PATENT DOCUMENTS

| | | | | | |
|---|---|---|---|---|---|
| CN | 112418854 | A | * | 2/2021 | |
| CN | 112541736 | A | * | 3/2021 | |
| CN | 112712420 | A | * | 4/2021 | ......... G06F 16/2393 |
| CN | 114418630 | A | * | 4/2022 | |
| WO | WO-2020051540 | A1 | * | 3/2020 | ......... G06F 16/2379 |

* cited by examiner

BLOCKCHAIN-BASED TRANSACTION SYSTEM FOR GREEN CERTIFICATE

TECHNICAL FIELD

This application relates to the transaction field of a green electricity certificate, and in particular, to a blockchain-based transaction system for a green certificate.

BACKGROUND

A green electricity certificate, referred to as a green certificate for short, is an electronic certificate that has a unique identification code and is issued by China for an on-grid electricity quantity of non-hydro renewable energy per megawatt hour of a power generation enterprise. As a confirmation and attribute certification of a generating capacity of the non-hydro renewable energy and the only certificate for consumption of green power, the green certificate is also a policy tool of a renewable-energy quota system. At present, an enterprise needs to submit related materials to various departments for review. After the review is partially passed, a green certificate is issued to the enterprise. An enterprise having a green certificate can sell the green certificate. A transaction occurs between a purchaser of a green certificate and a seller of the green certificate.

At present, the transaction of the green certificate is mostly carried out through listing on a transaction platform, which makes information of the seller of the green certificate and the purchaser of the green certificate unequal, that is, the purchaser can see sale information listed by the seller of the green certificate, but the seller of the green certificate does not know an expected price of the purchaser before listing. As a result, the purchaser of the green certificate only wants to buy a low-price green certificate based on a listed price, and the seller wants to sell the green certificate at a high price, resulting in a low turnover of a successful transaction.

SUMMARY

This application provides a blockchain-based transaction system for a green certificate to resolve a problem that a total quantity of successful transactions decreases.

To achieve the above objective, this application provides the following technical solutions.

This application provides a blockchain-based transaction system for a green certificate, including an on-chain node and an off-chain node, where the on-chain node includes an audit node and a proxy node, and the proxy node is used by a power producer and a purchaser for login;

the audit node is configured to verify qualification information of the power producer on the proxy node, and send a green certificate to the power producer on the proxy node when the qualification information satisfies a preset condition;

the off-chain node is configured to: perform calculation by using a preset model based on a historical transaction price, to obtain a first eigenvector for predicting a transaction price of a next transaction; map target features of each power producer on a current blockchain platform into implicit vectors, where the target features include a power generation type, current transaction information, and current information of the green certificate; aggregate the implicit vectors by using an objective function, to obtain a second eigenvector, where the objective function is a function for ensuring permutation invariability; and calculate the first eigenvector and the second eigenvector by using a fully connected neural network, to obtain the transaction price of the next transaction, where the transaction price is used to provide a reference for the power producer and the purchaser to determine a price;

the proxy node is configured to: when receiving sale information of the power producer and purchase information of the purchaser, send the sale information, a digital signature of the power producer, the purchase information, and a digital signature of the purchaser to the off-chain node;

the off-chain node is configured to match the sale information and the purchase information, send successfully matched transaction information to the proxy node, and return the sale information and the purchase information to a front end in a visual manner for display; and the proxy node is further configured to send the successfully matched transaction information to a transaction smart contract, and the transaction smart contract performs transaction processing based on the transaction information.

Optionally, when performing calculation by using the preset model based on the historical transaction price, to obtain the first eigenvector for predicting the transaction price of the next transaction, the off-chain node is specifically configured to:

obtain transaction prices of a preset quantity of transactions closest to a current transaction in historical transactions from a block; input the transaction prices into a preset long short-term memory (LSTM) model, where the LSTM model outputs an implicit vector corresponding to each transaction price; and take an implicit vector corresponding to a last transaction price as the first eigenvector.

Optionally, when calculating the first eigenvector and the second eigenvector by using the fully connected neural network, the off-chain node is specifically configured to:

stitch the first eigenvector and the second eigenvector to obtain a stitched eigenvector, and input the stitched eigenvector into the fully connected neural network to obtain a predicted transaction price.

Optionally, when matching the sale information and the purchase information, the off-chain node is specifically configured to:

match the sale information and the purchase information according to a two-way auction rule.

Optionally, a number of the proxy node in a blockchain system is set to 0, and another node in the blockchain system is numbered from 1; and when a master node fails, a process of selecting a master node by a current on-chain master node includes:

when the master node is numbered 0 and a trigger condition for replacing an original practical byzantine fault tolerance (PBFT) view is satisfied, determining the master node according to $$p = \left((v \bmod 2)\left\lceil\frac{v}{2}\right\rceil\right) \bmod N;$$

or when the current master node is not numbered 0, a trigger condition for replacing an original PBFT view is satisfied, or a confirmation message sent by a node numbered 0 is received in commit stages of consecutive k consensus processes, determining the master node according to $$p = \left( (v \bmod 2) \left\lceil \frac{v}{2} \right\rceil \right) \bmod N.$$

Optionally, a master node in the on-chain node collects transaction information generated within preset duration, and packages the transaction information into a block after verifying validity of the transaction information.

Optionally, the off-chain node is further configured to return the received sale information of the green certificate of the power producer and the received purchase information of the purchaser to the front end in the visual manner for display, so as to provide sale price information and the purchase information for the power producer and the purchaser.

Optionally, the objective function is an AGGREGATE function.

Optionally, the preset model is an LSTM model.

Optionally, the fully connected neural network is a multilayer perceptron (MLP) model.

The blockchain-based transaction system for a green certificate in this application includes the on-chain node and the off-chain node. The on-chain node includes the audit node and the proxy node, and the proxy node is used by the power producer and the purchaser for login.

On one hand, in this application, the power producer and the purchaser send the sale information and the purchase information to the proxy node, and the proxy node sends the sale information and the purchase information of the green certificate to the off-chain node for matching. Therefore, information inequality between two transaction parties caused by a sale through listing in the prior art can be avoided to a certain extent. In addition, the off-chain node further can return the sale information and the purchase information to the front end in the visual manner for display, such that the power producer and the purchaser can adjust the sale information or the purchase information based on the displayed information, so as to better reflect a market demand, achieve higher efficiency, and improve a turnover of a successful transaction.

On the other hand, in this application, the off-chain node performs calculation by using the preset model based on the historical transaction price, to obtain the first eigenvector for predicting the transaction price of the next transaction, and the first eigenvector reflects prediction information of the historical transaction price. The target features of each power producer on the current blockchain platform are mapped into the implicit vectors. The target features include the power generation type, the current transaction information, and the current information of the green certificate, in other words, the target features reflect prediction information of current environmental information. The implicit vectors are aggregated by using the objective function, to obtain the second eigenvector, and the first eigenvector and the second eigenvector are calculated by using the fully connected neural network, to obtain the transaction price of the next transaction.

In other words, in this application, on one hand, the off-chain node predicts the transaction price of the next transaction based on the historical transaction price and the current environmental information, to ensure accuracy of a prediction result. On the other hand, the off-chain node aggregates the implicit vectors by using the objective function, to obtain the second eigenvector. The objective function is a function for ensuring permutation invariability. In this way, in a process of aggregating the implicit vectors, a problem that the prediction result is inaccurate due to different second eigenvectors caused by different position sequences of implicit vectors of different power producers is eliminated. Because a blockchain network is a peer-to-peer (P2P) network, statuses of all nodes in a blockchain should be equal. Therefore, in this application, the implicit vectors are aggregated by using the objective function, and the obtained second eigenvector conforms to the characteristic that the statuses of all the nodes in the blockchain network should be equal. Therefore, the prediction result conforms to a characteristic of the blockchain, thereby further ensuring accuracy of a predicted price in this application.

Therefore, the next transaction price predicted in this application can be used as a reference for the power producer and the purchaser. This makes it easier to match the sale information of the power producer and the purchase information of the purchaser successfully, thereby further improving a transaction success rate and improving a transaction turnover.

In conclusion, this application can improve the transaction turnover.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DETAILED DESCRIPTION

The technical solutions in the embodiments of this application are clearly and completely described below with reference to the accompanying drawings in the embodiments of this application. Apparently, the described embodiments are merely some rather than all of the embodiments of this application. All other embodiments obtained by those of ordinary skill in the art based on the embodiments of this application without creative efforts should fall within the protection scope of this application.

In the embodiments of this application, a green certificate is issued and dealt on a blockchain. Blockchain data can be sorted and reviewed more easily due to its traceability and non-tamperability, thereby improving approval and issuance efficiency of the green certificate and improving transparency of information. In addition, decentralization makes a system more robust without worrying about a data loss.

The blockchain is a new application mode of computer technologies such as distributed data storage, point-to-point transmission, a consensus mechanism, and an encryption algorithm. The blockchain is a chained data structure obtained by sequentially connecting data blocks in chronological order, and a distributed ledger that cannot be tampered with or forged by means of cryptography. The distributed ledger means that transaction bookkeeping is jointly completed by a plurality of nodes distributed in different places, and each node records a complete account, such that they can participate in supervising legitimacy of a transaction and give evidence for the transaction together. This avoids a possibility that a single bookkeeper is controlled or bribed to record a false account, and in this patent, prevents a renewable-energy power producer from colluding with an audit center to defraud a green certificate. Data stored in the chained structure has good traceability, and can be collected and sorted conveniently. In this way, the green certificate can be approved and issued automatically, a labor cost is saved, and a manual error is avoided.

In the embodiments of this application, a power producer and a purchaser can adjust a quotation based on feedback sale information and purchase information. Therefore, a blockchain system in the embodiments of this application needs to have high real-time performance. In order to ensure real-time performance, the embodiments of this application introduce a proxy node and an off-chain node. The proxy node forwards the sale information and a digital signature of the power producer and the purchase information and a digital signature of the purchaser to the off-chain node for matching and management. In this way, most workload of a transaction process is transferred to the off-chain node, thereby reducing a processing capacity of an on-chain node and further improving the real-time performance.

In addition, an on-chain part records a power generation status of each power plant, and a smart contract reviews the power generation status of the power plant and other necessary data every month, and automatically issues a green certificate to a qualified enterprise. Moreover, the green certificate is also dealt on the chain in a form of the smart contract, so as to record corresponding transaction information and make transaction data public.

Figure 1:
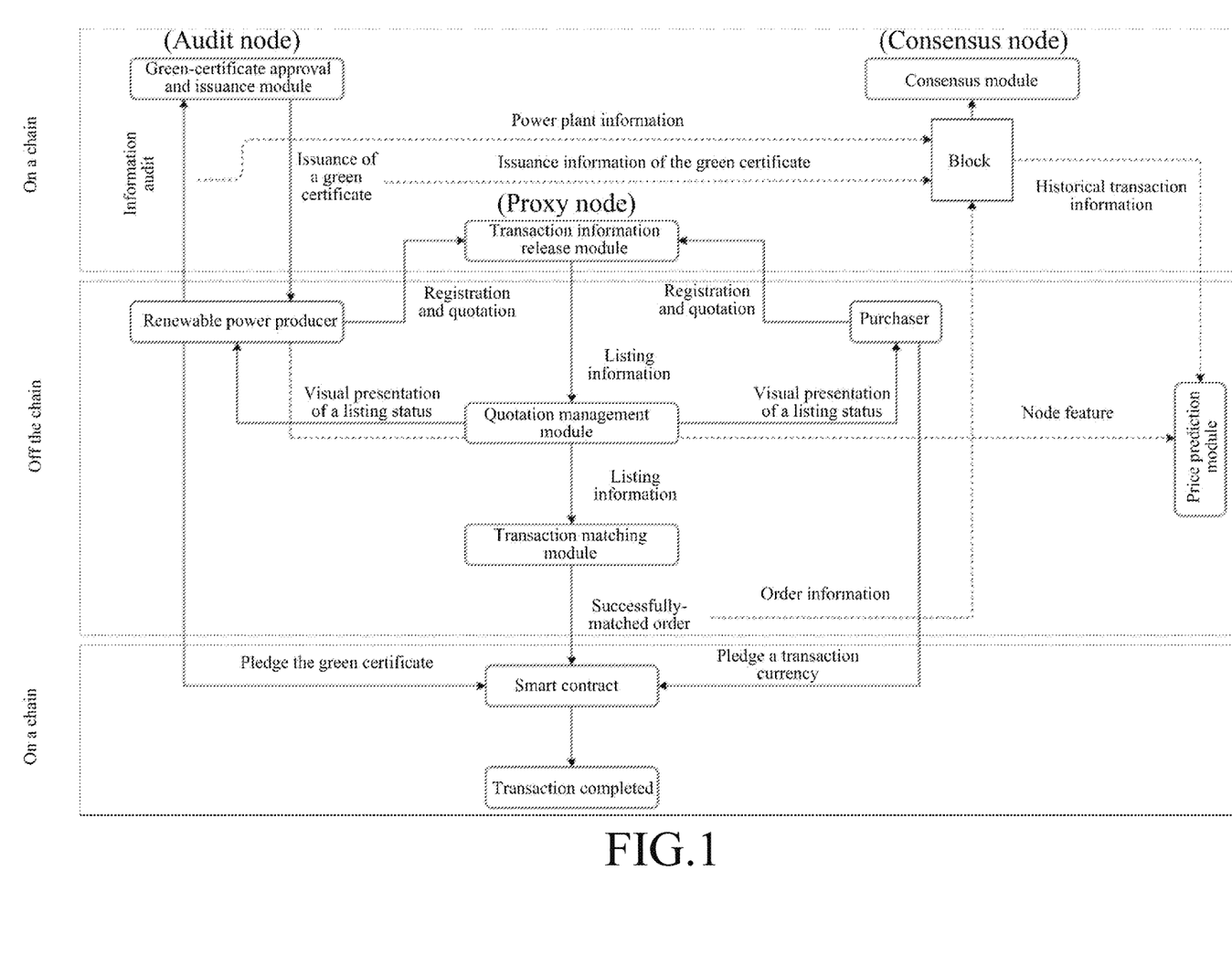
FIG. 1 is a schematic structural diagram of a blockchain-based transaction system for a green certificate according to an embodiment of this application.

FIG. 1 shows a blockchain-based transaction system for a green certificate according to an embodiment of this application. The system includes an on-chain node, an off-chain node, a smart contract, and a block, where the on-chain node may include an audit node, a proxy node, and a consensus node. The proxy node is used by a power producer and a purchaser for login. The proxy node is a proxy server.

FIG. 1 visually shows an on-chain part and an off-chain part. The on-chain part includes a green-certificate approval and issuance module (corresponding to the audit node), a consensus module (corresponding to the consensus node), a transaction information release module (corresponding to the proxy node), and the smart contract.

The green-certificate approval and issuance module mainly realizes a function of automatically approving and issuing a green certificate, verifies a qualification of a power plant (corresponding to the power producer in this embodiment) in a form of the smart contract, and issues the green certificate to a qualified enterprise. The node also collects an approval and issuance record as a transaction record and packages the record into a block for storage. The transaction information release module mainly manages identities of two transaction parties for registration, verification, encryption, and signature management, and carries out identity verification and information encryption for a transaction user and identity signature confirmation in a transaction process. The consensus module is configured to verify the generated block, and uses a PBFT algorithm as a consensus algorithm to determine a master node that currently dominates a consensus and execute a consensus process.

The off-chain part may include a quotation management module (belonging to the off-chain node) and a transaction matching module (belonging to the off-chain node).

The quotation management module is configured to manage quotations of both a supplier and a demander in a transaction process, and return the quotations to a front end in a visual manner to display the quotations for a user, which can be analogical with a stock trading scenario. The quotation management module sends quotation information (corresponding to sale information and purchase information in this embodiment) to the transaction matching module. The transaction matching module sorts and matches the quotation information according to a certain rule and the quotation information of the two parties, and encrypts and signs the transaction information.

In this embodiment of this application, the power producer receives an identity identifier ($ID_i$) after review. A power producer i can join an on-chain system by registering with the proxy node based on $ID_i$. When the power producer joins the on-chain system for the first time, a blockchain system allocates a public key ($PK_i$), a private key ($SK_i$), a wallet address ($WA_i$), and a certificate ($Cert_i$) to the power producer. The certificate may include basic information of the power producer connected to a network, such as a company name, an address, an installed capacity, and a smart meter ID ($SMID_i$). After obtaining the above information, the newly joined power producer downloads a ledger by using a surrounding node, and officially becomes a node in the blockchain network after completing synchronization. After the purchaser registers with the proxy node, the system allocates a public key, a private key, and a wallet address to the purchaser. The purchaser can log in to the system based on the public key and a set password.

In this embodiment, the smart contract for approving and issuing the green certificate on a blockchain operates regularly. The audit node (the green-certificate approval and issuance module of the audit node) issues the green certificate to the power producer by accounting data of a smart meter of the power plant and other necessary information. As specified, one green certificate is issued per 1 MWh. The smart contract issues the green certificate to the wallet address of the corresponding power producer by means of a transaction. Each green certificate can be represented by REC={ID,t,c,m}, where ID represents a serial number of the green certificate, t represents issuance time, c represents a type of green power and identifies wind power, photoelectricity, and another type, and m represents some additional information, including an affiliated enterprise, a project number, and the like.

In this embodiment, the power producer pledges a to-be-sold green certificate in a bidding transaction smart contract, marks a sale price, and sends a message to an address of the transaction smart contract and the transaction information release module of the proxy node. The message can be represented by sellOrder=$\left( (REC_{j,rid} \ldots ), P_{ask}, t \right)$, where $REC_{j,rid} \ldots$ represents a green certificate whose ID is rid and is to be sold by a seller j, $P_{ask}$ represents a sale price, and t represents listing time. In addition, the sale information (a quantity of to-be-sold green certificates and the sale price) and a digital signature, namely, $\left( \text{sellOrder}, \text{sign}_{SK_j}(\text{MD5}(\text{sellOrder})) \right)$, are sent to the off-chain node (also known as a bidding server). The off-chain node (for example, a quotation management module of the bidding server) renders the sale information and returns rendered sale information to the user (the seller and the purchaser) by using the front end. If all the green certificates are not sold successfully after a period of time, the smart contract returns a remaining green certificate to the seller (power producer).

In this embodiment, the purchaser releases the purchase information (which may be a purchase price and a quantity of to-be-purchased green certificates) in the proxy node (for example, the transaction information release module of the proxy node), and pledges a required currency in the bidding transaction smart contract, in other words, sends buyOrder= $\langle P_{bid}, d, Coin, t \rangle$ to the address of the transaction smart contract and the proxy node (which may specifically be the transaction information release module of the proxy node), where $P_{bid}$ represents a unit purchase price, d represents the quantity of to-be-purchased green certificates, Coin=$P_{bid}$*d represents a quantity of currencies pledged to the contract, and t represents listing time. The proxy node sends the purchase information and a digital signature, namely, buyOrder=$\langle$ buyOrder, $sign_{SKi}$(MD5(buyOrder))$\rangle$, to the off-chain node (bidding server). The off-chain node (the quotation management module of the bidding server) renders the purchase information and returns rendered purchase information to the user (the seller and the purchaser) by using the front end. If the purchaser does not buy a sufficient quantity of green certificates after a period of time, the smart contract returns a remaining currency to the purchaser.

In this embodiment, the power producer and the purchaser conduct a bidding transaction, specifically by using a two-way auction mechanism. Two-way auction refers to a transaction that can be concluded provided that one party accepts a bid of the other party. Then a new round of bidding starts. There may be a plurality of transaction periods, and a transaction price is always between an initial bid and an initial sale price. In a whole transaction process, price information is public. Continuous two-way auction does not limit a quantity of bidding times and a bidding frequency, such that the purchaser and the seller can adjust their quotations in real time, thereby better reflecting a market demand and achieving higher efficiency.

Specifically, in this embodiment, the power producer sends the sale information to the proxy node (which may specifically be the transaction information release module of the proxy node), and the purchaser sends the purchase information to the proxy node (which may specifically be the transaction information release module of the proxy node). The proxy node sends the sale information, the digital signature of the power producer, the purchase information, and the digital signature of the purchaser to the off-chain node. The off-chain node (which may specifically be the quotation management module of the bidding server) renders the sale information and the purchase information, and returns the rendered sale information and purchase information to the user, such that the seller and the purchaser can adjust their quotations in real time.

In order to make the quotations of the power producer and the purchaser more reasonable and further improve a transaction success rate, in this embodiment, the off-chain node (which may specifically be a price prediction module of the bidding server) predicts a transaction price of a next transaction based on historical transaction price information and current information of the power producer.

Figure 2:
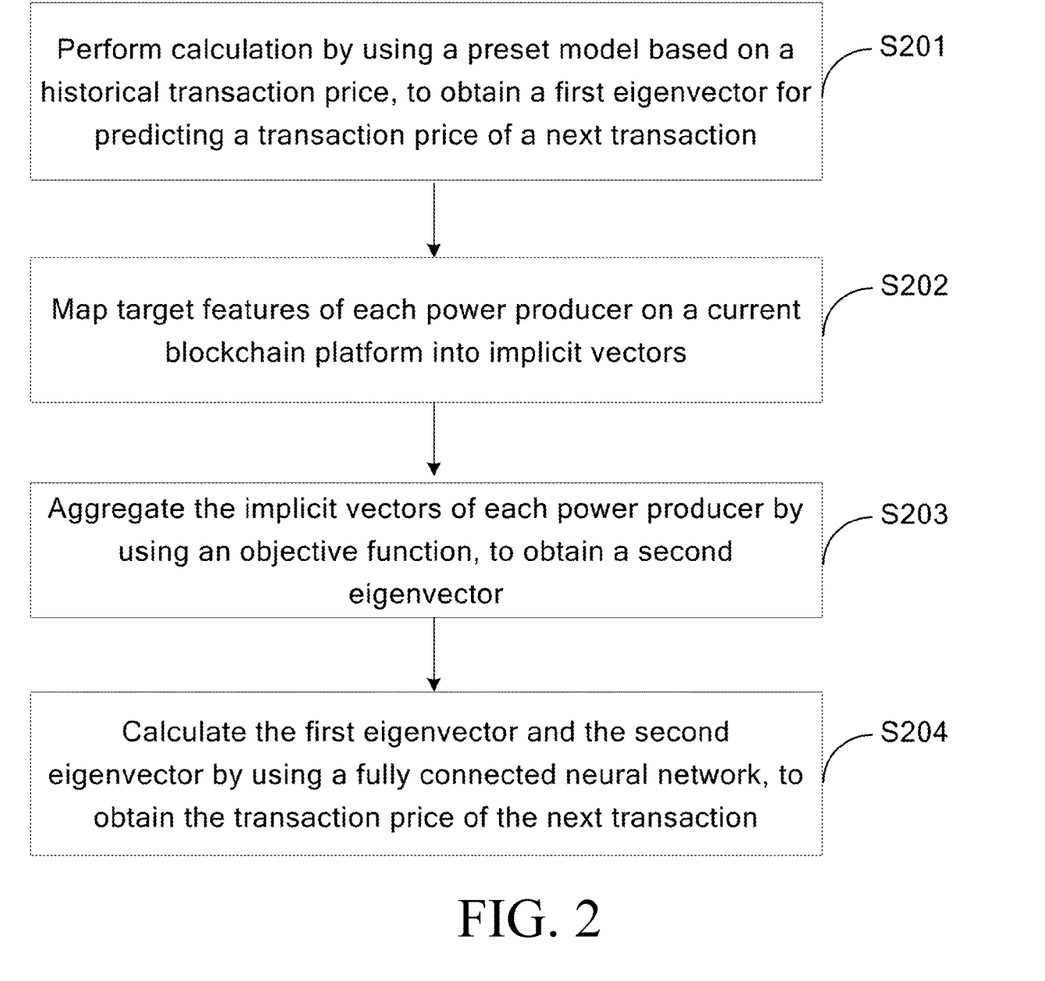
FIG. 2 is a flowchart of a method for predicting a transaction price of a next transaction according to an embodiment of this application.

A specific prediction process is described in an embodiment corresponding to FIG. 2, and is not repeated herein.

The off-chain node (which may specifically be the transaction matching module of the bidding server) matches the sale information and the purchase information. A successfully matched transaction is represented by orders and digital signatures of two transaction parties, namely, matchedOrder=$\langle$ sellOrder, $sign_{SKj}$(MD5(sellOrder)),buyOrder, $sign_{SKi}$(MD5(buyOrder))$\rangle$. Then the off-chain node sends information ($\langle$ matchedOrder, $sign_{SKas}$(MD5(matchedOrder))$\rangle$) of the successfully matched transaction to the proxy node, where $SK_{as}$ represents a private key of the off-chain node (which may specifically be the bidding server). The off-chain node (which may specifically be the bidding server) updates the transaction information after sending $\langle$ matchedOrder, $sign_{SKas}$(MD5(matched Order))$\rangle$ to the proxy server.

The proxy node sends, to the bidding transaction smart contract on the blockchain, the information sent by the off-chain node. After verifying validity of the transaction information, the smart contract carries out a transaction by using the currency and the green certificate that are pledged by the two parties respectively. If the green certificates of the seller are not fully sold in this transaction, the smart contract generates a new order for the remaining green certificate at the same price and gives a new timestamp for release. If the purchaser fails to purchase enough green certificates in this transaction, the smart contract generates a new order based on the remaining currency and a required quantity of green certificates, and gives a new timestamp for release.

In this embodiment, a master node collects all transactions generated within a period of time, locally verifies validity of the transactions, and packages the transactions into one block. Similar to a bitcoin block, a block includes a block header and a block body. The block body stores transaction information in a form of a Merkle tree, and a hash value of a Merkle root is saved in the block header. In addition, the block header further includes a hash value, a version, a timestamp, and the like of a previous block. This embodiment does not use a proof of work, so the block header does not need to contain a random number.

FIG. 2 shows a method for predicting a transaction price based on the system in the above embodiment. The method may include the following steps.

S201: Perform calculation by using a preset model based on a historical transaction price, to obtain a first eigenvector for predicting a transaction price of a next transaction.

In this embodiment, because historical transaction information is stored in a block, the historical transaction price can be obtained from the block in this step. In order to improve accuracy of a prediction result, in this embodiment, transaction prices of a preset quantity of transactions closest to a current transaction in historical transactions can be obtained from the block.

For example, in this embodiment, the obtained transaction price is represented by $\{x_1, x_2, \ldots, x_t\}$, where $x_t$ represents transaction prices of the last t transactions.

In this step, a process in which an off-chain node performs calculation by using the preset model based on the historical transaction price, to obtain the first eigenvector for predicting the transaction price of the next transaction may include the following steps A1 and A2.

A1: Input the obtained transaction price into a preset LSTM model.

In this embodiment, the LSTM model is used.

In this embodiment, the LSTM model performs an iterative operation on the input transaction prices of the preset quantity of transactions. For any price, the LSTM model performs specific operations according to the following formulas (1) to (6):

$$i_t = \sigma(W_{ii}x_t + b_{ii} + W_{ii}h_{t-1} + b_{ii}) \quad (1)$$

$$f_t = \sigma(W_{if}x_t + b_{if} + W_{hf}h_{t-1} + b_{hf}) \quad (2)$$

$$g_t = \tanh(W_{ig}x_t + b_{ig} + W_{hg}h_{t-1} + b_{hg}) \quad (3)$$

$$o_t = \sigma(W_{io}x_t + b_{io} + W_{ho}h_{t-1} + b_{ho}) \quad (4)$$

$$c_t = f_t \odot c_{t-1} + i_t \odot g_t \quad (5)$$

$$h_t = o_t \odot \tanh(c_t) \quad (6)$$

In the above formulas, i, f, g, and o represent an input gate, a forget gate, a newly added cell state, and an output gate respectively, c represents a cell state, h represents an implicit vector, and $W_{ii}$, $b_{ii}$, $W_{if}$, $b_{if}$, $W_{hf}$, $b_{hf}$, $W_{ig}$, $b_{ig}$, $W_{hg}$, $b_{hg}$, $W_{io}$, $b_{io}$, $W_{ho}$, and $b_{ho}$ represent parameters to be obtained through model training. σ represents a sigmoid function used as an activation function, $h_{t-1}$ represents an implicit vector of a previous time point (t−1 time point), and $\tanh(c_t)$ represents a tanh function used as an activation function for a cell state c at a t time point.

According to the above formulas (1) to (6), the LSTM model outputs an implicit vector corresponding to each transaction price.

A2: Take an implicit vector corresponding to a last transaction price as the first eigenvector.

In this embodiment, the final implicit vector is taken as an embedding of historical periodic change information, and for convenience of description, is taken as the first eigenvector for predicting the next transaction price.

S202: Map target features of each power producer on a current blockchain platform into implicit vectors.

In this embodiment, the target features include a power generation type, current transaction information, and current information of a green certificate. Certainly, in practice, the target features may further include an expected quantity of to-be-generated green certificates and weather, and may further include another feature, provided that the target feature can reflect current environmental information of the power producer.

In this embodiment, the target features of each power producer in a current blockchain system are mapped into the implicit vectors based on a same mapping principle. For convenience of description, this embodiment takes any power producer as an example for description.

In this step, the target features of the power producer may be mapped into the implicit vectors by using an MLP model. In this embodiment, the MLP model is a fully connected neural network.

In this embodiment, the target features of the power producer may be mapped into the implicit vectors by using a trained MLP model. A training process may be executed by using $L_\theta = \|y - \hat{y}\|$ as a loss function. In the loss function, $\|\ \|$ represents a second-order norm, θ represents a to-be-trained parameter, y represents a real value, and $\hat{y}$ represents a value predicted by the model.

S203: Aggregate the implicit vectors of each power producer by using an objective function, to obtain a second eigenvector.

In this embodiment, the objective function is a function for ensuring permutation invariability.

In this embodiment, the objective function may specifically be an AGGREGATE function, an avg( ) function, a max( ) function, a sum( ) function, or the like. Certainly, in practice, the objective function may also be another function. This embodiment does not limit specific content of the objective function, provided that the objective function is a function that can ensure the permutation invariability.

In this embodiment, the objective function can ensure the permutation invariability. Therefore, in this step, a sorting order of implicit vectors of all power producers does not affect accuracy of a prediction result of the transaction price of the next transaction. Therefore, it can be ensured that all nodes in a P2P network of a blockchain have an equal status, thereby further ensuring accuracy of a result of price prediction based on the second eigenvector.

In this embodiment, the objective function not only can ensure the accuracy of the prediction result, but also can simplify the model and alleviate overfitting to a certain extent because the objective function does not introduce any additional parameter.

S204: Calculate the first eigenvector and the second eigenvector by using the fully connected neural network, to obtain the transaction price of the next transaction.

In this embodiment, the transaction price is used to provide a reference for the power producer and a purchaser to determine a price.

In this step, the first eigenvector and the second eigenvector can be stitched to obtain a stitched vector, and then the stitched vector is input into the trained MLP model to output a predicted value of the transaction price of the next transaction. The predicted value can be represented by $$p = \left((v \bmod 2)\left\lceil \frac{v}{2} \right\rceil\right) \bmod N,$$

where arg min represents returning a parameter that makes a target formula minimum.

In this embodiment, a consensus node uses PBFT as a consensus mechanism. The consensus node executes a consensus process, and a block confirmed by executing the consensus process can be written to a local blockchain. In the PBFT, when a master node fails, a view is updated according to a view replacement protocol, in other words, a new master node is selected. The master node plays a role of generating a block and dominating a consensus, and should have higher stability and performance. A proxy node of an on-chain system not only is a node in the blockchain network, but also is a portal server logged in by another user and is operated by a professional team. Therefore, the proxy node has higher stability and performance than a machine of the power producer, and is less likely to be maliciously manipulated. Considering the above factors, this embodiment of this application changes a view replacement strategy.

Specifically, a number of the proxy node in the on-chain blockchain system is set to 0, and another node is sequentially numbered 1, 2, . . . N−1. The master node is generated according to the following formula:

$$\theta^* = \arg\min_\theta L_\theta,$$

where mod represents a modulus operation, v∈N represents a number of a new view, and $v=v_{pre}+1$. $v_{pre}$ represents a number of a previous view, [•] represents rounding up, and p represents the new master node. When a current master node is 0, if a trigger condition for replacing an original PBFT view is satisfied, the new master node is selected according to the above formula to replace the view. When a current master node is not 0, if a trigger condition for replacing an original PBFT view is satisfied, or the master node receives a confirmation message from a node 0 in commit stages of consecutive k consensus processes, the new master node is selected according to the above formula to replace the view. In this embodiment, other operations in the view replacement protocol remain unchanged except that a manner of generating the master node changes.

In the above manner of selecting the master node, the proxy server node can be used as the master node in most cases. This greatly improves stability of the system and reduces a burden of a machine in a power plant, thereby realizing efficient running of the system.

In the embodiments of this application, the green-certificate approval and issuance module, the consensus module, and the transaction information release module each may be one or more processors or chips that each has a communication interface, can realize a communication protocol, and may further include a memory, a related interface and system transmission bus, and the like if necessary. The processor or chip executes program-related code to realize a corresponding function. The quotation management module, the transaction matching module, and the price prediction module each may be one or more processors or chips that each has a communication interface, can realize a communication protocol, and may further include a memory, a display, a related interface and system transmission bus, and the like if necessary. The processor or chip executes program-related code to realize a corresponding function.

The embodiments in the specification are described in a progressive manner, each embodiment focuses on the difference from other embodiments, and it is sufficient to refer to one another for the same and similar parts among the embodiments.

For the above description of the disclosed embodiments, the features recorded in the embodiments in the specification can be mutually replaced or combined, which enables a person skilled in the art to implement or practice this application.

The above description of the disclosed embodiments can enable a person skilled in the art to implement or practice this application. Various modifications to the embodiments are readily apparent to a person skilled in the art, and the generic principles defined herein may be practiced in other embodiments without departing from the spirit or scope of this application. Thus, this application is not limited to the embodiments shown herein but falls within the widest scope consistent with the principles and novel features disclosed herein.

The invention claimed is:

1. A blockchain-based transaction system for a green certificate, comprising an on-chain node and an off-chain node, wherein the on-chain node comprises an audit node and a proxy node, and the proxy node is used by a power producer and a purchaser for login;
the audit node is configured to verify qualification information of the power producer on the proxy node, and send a green certificate to the power producer on the proxy node when the qualification information satisfies a preset condition;
the off-chain node is configured to: perform calculation by using a preset model based on a historical transaction price, to obtain a first eigenvector for predicting a transaction price of a next transaction; map target features of each power producer on a current blockchain platform into implicit vectors, wherein the target features comprise a power generation type, current transaction information, and current information of the green certificate; aggregate the implicit vectors by using an objective function, to obtain a second eigenvector, wherein the objective function is a function for ensuring permutation invariability; and calculate the first eigenvector and the second eigenvector by using a fully connected neural network, to obtain the transaction price of the next transaction, wherein the transaction price is used to provide a reference for the power producer and the purchaser to determine a price;
the proxy node is configured to: when receiving sale information of the power producer and purchase information of the purchaser, send the sale information, a digital signature of the power producer, the purchase information, and a digital signature of the purchaser to the off-chain node;
the off-chain node is configured to match the sale information and the purchase information, send successfully matched transaction information to the proxy node, and return the sale information and the purchase information to a front end in a visual manner for display;
the proxy node is further configured to send the successfully matched transaction information to a transaction smart contract, and the transaction smart contract performs transaction processing based on the transaction information; and
when calculating the first eigenvector and the second eigenvector by using the fully connected neural network, the off-chain node is specifically configured to:
stitch the first eigenvector and the second eigenvector to obtain a stitched eigenvector, and input the stitched eigenvector into the fully connected neural network to obtain a predicted transaction price.

2. The system according to claim 1, wherein when performing calculation by using the preset model based on the historical transaction price, to obtain the first eigenvector for predicting the transaction price of the next transaction, the off-chain node is specifically configured to:
obtain transaction prices of a preset quantity of transactions closest to a current transaction in historical transactions from a block; input the transaction prices into a preset long short-term memory (LSTM) model, wherein the LSTM model outputs an implicit vector corresponding to each transaction price; and take an implicit vector corresponding to a last transaction price as the first eigenvector.

3. The system according to claim 1, wherein when matching the sale information and the purchase information, the off-chain node is specifically configured to:
match the sale information and the purchase information according to a two-way auction rule.

4. The system according to claim 1, wherein a number of the proxy node in a blockchain system is set to 0, and another node in the blockchain system is numbered from 1; and
when a master node fails, a process of selecting a master node by a current on-chain master node comprises:
when the master node is numbered 0 and a trigger condition for replacing an original practical byzantine fault tolerance (PBFT) view is satisfied, determining the master node according to $$p = \left((v \bmod 2)\left\lceil \frac{v}{2} \right\rceil\right) \bmod N;$$

or when the current master node is not numbered 0, a trigger condition for replacing an original PBFT view is satisfied, or a confirmation message sent by a node numbered 0 is received in commit stages of consecutive k consensus processes, determining the master node according to $$p = \left((v \bmod 2)\left\lceil \frac{v}{2} \right\rceil\right) \bmod N.$$

5. The system according to claim 1, wherein a master node in the on-chain node collects transaction information generated within preset duration, and packages the transaction information into a block after verifying validity of the transaction information.

6. The system according to claim 1, wherein the off-chain node is further configured to return the received sale information of the green certificate of the power producer and the received purchase information of the purchaser to the front end in the visual manner for display, so as to provide sale price information and the purchase information for the power producer and the purchaser.

7. The system according to claim 1, wherein the objective function is an AGGREGATE function.

8. The system according to claim 1, wherein the preset model is an LSTM model.

9. The system according to claim 1, wherein the fully connected neural network is a multilayer perceptron (MLP) model.

* * * * *